US012547652B2

(12) United States Patent
Lau et al.

(10) Patent No.: US 12,547,652 B2
(45) Date of Patent: Feb. 10, 2026

(54) SYSTEMS AND METHODS FOR AUTOMATED DATA SET MATCHING SERVICES

(71) Applicant: Protiviti Inc., Menlo Park, CA (US)

(72) Inventors: Wai Ho Lau, Manhasset, NY (US); Kalabe Gizaw Haile, Harrison, NJ (US); Scott Colin Laliberte, Sewell, NJ (US); Arun Kumar Tripathi, Los Angeles, CA (US)

(73) Assignee: Protiviti Inc., Menlo Park, CA (US)

( * ) Notice: Subject to any disclaimer, the term of this patent is extended or adjusted under 35 U.S.C. 154(b) by 186 days.

(21) Appl. No.: 18/175,783

(22) Filed: Feb. 28, 2023

(65) Prior Publication Data

US 2024/0289364 A1 Aug. 29, 2024

(51) Int. Cl.
 *G06F 16/334* (2025.01)
 *G06F 16/3329* (2025.01)
 *G06F 40/40* (2020.01)

(52) U.S. Cl.
 CPC ...... *G06F 16/3347* (2019.01); *G06F 16/3329* (2019.01); *G06F 40/40* (2020.01)

(58) Field of Classification Search
 CPC ... G06F 16/3347; G06F 16/3329; G06F 40/40
 See application file for complete search history.

(56) References Cited

U.S. PATENT DOCUMENTS

| | | | | |
|---|---|---|---|---|
| 11,631,021 | B1* | 4/2023 | Benjamin | G06Q 50/18 704/1 |
| 2010/0257167 | A1* | 10/2010 | Liu | G06F 16/35 707/731 |
| 2016/0203208 | A1* | 7/2016 | Anderson | G06F 16/353 707/738 |
| 2017/0124484 | A1* | 5/2017 | Thompson | G06F 3/0484 |
| 2017/0372190 | A1* | 12/2017 | Bishop | G06F 16/00 |
| 2018/0032589 | A1* | 2/2018 | Allen | G06F 40/279 |
| 2018/0349377 | A1* | 12/2018 | Verma | G06N 3/045 |
| 2019/0370629 | A1* | 12/2019 | Liu | G06N 5/041 |

(Continued)

OTHER PUBLICATIONS

Puerto, Haritz, Gözde Gül ahin, and Iryna Gurevych. "Metaqa: Combining expert agents for multi-skill question answering." arXiv preprint arXiv:2112.01922 (2021). (Year: 2021).*

(Continued)

*Primary Examiner* — Anne L Thomas-Homescu
(74) *Attorney, Agent, or Firm* — Foley & Lardner LLP

(57) ABSTRACT

The present solution provides systems and methods to receive a data set comprising a representation of one or more questions from a survey and provide the data set as input to each of a plurality of machine learning models trained to predict a domain associated with the one or more questions. The systems and methods can receiving as output a first domain prediction for the domain from each of the plurality of machine learning models and determine a second domain prediction for the domain for each question of the one or more questions based on applying a function to each of the first domain predictions. The systems and methods can select, based on the data set and the second domain prediction, an enumerated list of one or more answers from an answer set and cause a display of the enumerated list via a user interface for a selection.

17 Claims, 10 Drawing Sheets

(56) References Cited

U.S. PATENT DOCUMENTS

| | | | | |
|---|---|---|---|---|
| 2020/0073895 | A1* | 3/2020 | Vira | G06F 16/906 |
| 2021/0391039 | A1* | 12/2021 | Laszlo | G16H 10/20 |
| 2022/0084513 | A1* | 3/2022 | Sgobba | G10L 15/063 |
| 2023/0316150 | A1* | 10/2023 | Phan | G06N 3/0985 |
| 2023/0342167 | A1* | 10/2023 | Radkoff | G06F 16/957 |
| 2023/0385861 | A1* | 11/2023 | Ghose | G06Q 30/0203 |
| 2024/0256988 | A1* | 8/2024 | Morato | G06N 3/08 |
| 2024/0273105 | A1* | 8/2024 | Martigny | G06F 16/9535 |

OTHER PUBLICATIONS

Aroussi Said Alami et al: "Improving question answering systems by using the explicit semantic analysis method", 2016 11th International Conference on Intelligent Systems: Theories and Applications (SITA), IEEE, Oct. 19, 2016 (Oct. 19, 2016), pp. 1-6, XP033017396, DOI: 10.1109/SITA.2016.7772300 [retrieved on Dec. 5, 2016] the whole document.
Foreign Search Report on PCT Dtd Apr. 22, 2024.
Haritz Puerto et al: "MetaQA:Combining Expert Agents for Multi-Skill Question Answering", arxiv.org, Cornell University Library, 201 Olin Library Cornell University Ithaca, NY, 14853, Jan. 22, 2023 (Jan. 22, 2023), XP091418835.
Aroussi Said Alami et al: "Improving question answering systems by using the explicit semantic analysis method". 2016 11th International Conference on Intelligent Systems: Theories and Applications (SITA), IEEE, Oct. 19, 2016 (Oct. 19, 2016, pp. 1-6, XP033017396, DOI: 10.1109/SITA.2016.7772300.
International Preliminary Report on PCT AppIn PCT/US2024/017224 dated Sep. 11, 2025.

\* cited by examiner

| Question ID | Question | Answer | Valid Date | Applicability |
|---|---|---|---|---|
| Domain1_1 | Q1... | A1... | Through 19JAN2038 | GDPR |
| Domain1_2 | Q2... | A2... | 01JAN2020-31DEC2030 | All |
| Domain1_3 | Q3... | A3... | From 01JAN2025 | QoS LEVEL 2 |
| Domain2_1 | Q4... | A4... | 01JUN2024-31DEC2025 | All |
| Domain2_2 | Q5... | A5... | All | All |

FIG. 3

SYSTEMS AND METHODS FOR AUTOMATED DATA SET MATCHING SERVICES

FIELD OF THE DISCLOSURE

This disclosure generally relates to systems and methods for automated data set mapping services.

BACKGROUND OF THE DISCLOSURE

Modern organizations may provide surveys to assess partners or otherwise assemble information. For example, organizations can audit compliance according to a survey. Various organizations or individuals can request same or similar information by differently phrased or formatted surveys. Generating appropriate responses to each question may incur substantial time, duplicative effort, generate variance between responses, and the like. Further, manual question responses may omit relevant information or include erroneous information.

Providing a list of pre-approved banked responses can limit a number of responses which are manually generated. However, banked responses can require manual searching, and may be prone to user error in a selection thereof. For example, various users can select different responses according to a same question or question type. Further, banked responses may require updates based on changes or new information. Moreover, some questions may lack an appropriate response. Thus, it may be difficult to associate a received question with a corresponding response.

BRIEF SUMMARY OF THE DISCLOSURE

The present disclosure provides systems and methods for data set matching services. A data processing system can receive a data set including various questions from a survey. The data processing system can delimit each question of the dataset, and generate a vector for each delimited question. The data processing system can employ various machine learning models trained to predict a question domain for the vectored questions. The data processing system can arbitrate a prediction of the various machine learning models (e.g., via voting). The data processing system can match an answer of the predicted domain corresponding to the questions. For example, the data processing system can maintain a set of question-answer pairs, and determine a similarity (e.g., match) between a question of the received data set and a question of a question-answer pair. The data processing system can select an answer corresponding to the matched question, and present the answer to a user via a user interface. The user interface can receive feedback as to whether a presented answer is selected by the user, and retrain the machine learning models based on said feedback.

In one aspect, this disclosure is directed to a method. The method may be performed by a data processing system. The method includes receiving a data set comprising a representation of one or more questions from a survey. The method includes providing the data set as input to each of a plurality of machine learning models trained to predict a domain associated with the one or more questions. The method includes receiving as output a first domain prediction for the domain from each of the plurality of machine learning models. The method includes determining a second domain prediction for the domain for each question of the one or more questions based on applying a function to each of the first domain predictions. The method includes selecting, based on the data set and the second domain prediction, an enumerated list of one or more answers from an answer set. The method includes causing a display of the enumerated list via a user interface for a selection.

In another aspect, this disclosure is directed to a system. The system includes at least one processor associated with a data processing system. The system includes at least one memory storing computer-readable instructions. The processor is operable to access the at least one memory and execute the computer-readable instructions. The computer-readable instructions include instructions to receive a data set comprising a representation of one or more questions from a survey. The computer-readable instructions include instructions to provide the data set as input to each of a plurality of machine learning models trained to predict a domain associated with the one or more questions. The computer-readable instructions include instructions to receive as output a first domain prediction for the domain from each of the plurality of machine learning models. The computer-readable instructions include instructions to determine a second domain prediction for the domain for each question of the one or more questions based on applying a function to each of the first domain predictions. The computer-readable instructions include instructions to select an enumerated list of one or more answers from an answer set. The enumerated list may be selected based on the data set and the second domain prediction. The computer-readable instructions include instructions to cause a display of the enumerated list via a user interface for a selection.

In another aspect, this disclosure is directed to a computer-readable memory. The computer-readable memory stores computer-readable instructions thereon to receive a data set comprising a representation of one or more questions from a survey. The computer-readable memory stores computer-readable instructions thereon to provide the data set as input to each of a plurality of machine learning models trained to predict a domain associated with the one or more questions. The computer-readable memory stores computer-readable instructions thereon to receive as output a first domain prediction for the domain from each of the plurality of machine learning models. The computer-readable memory stores computer-readable instructions thereon to determine a second domain prediction for the domain for each question of the one or more questions based on applying a function to each of the first domain predictions. The computer-readable memory stores computer-readable instructions thereon to select, based on the data set and the second domain prediction, an enumerated list of one or more answers from an answer set. The computer-readable memory stores computer-readable instructions thereon to cause a display of the enumerated list via a user interface for a selection.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 is an answer set including question-answer pairs, in accordance with some embodiments.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for automated data set mapping services.

A. Computing and Network Environment

Figure 1A:
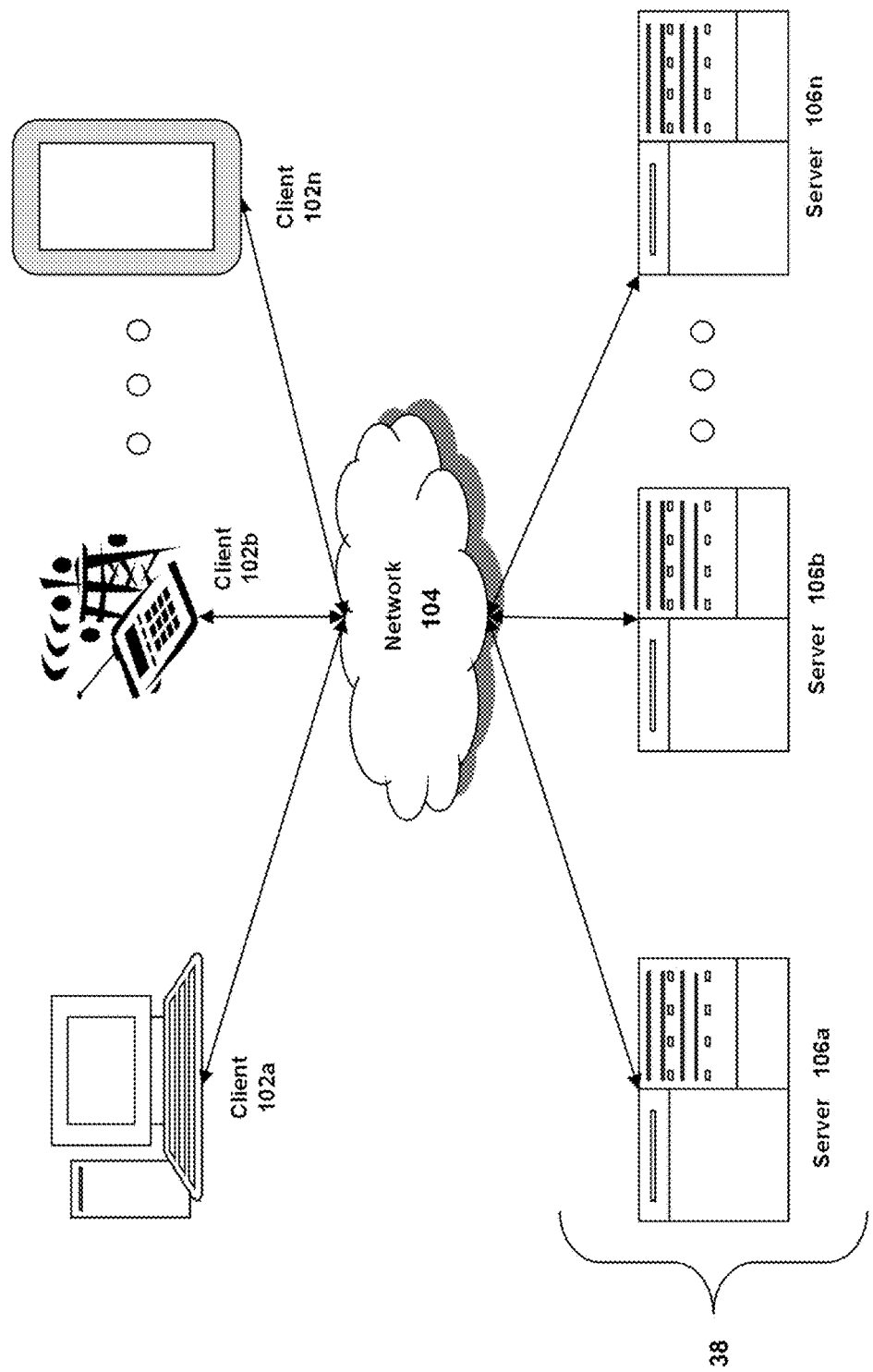
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In some embodiments, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In some embodiments, the server 106 may be referred to as a remote machine or a node. In another embodiment, a plurality of nodes 106 may be in the path between any two communicating servers.

Figure 1B:
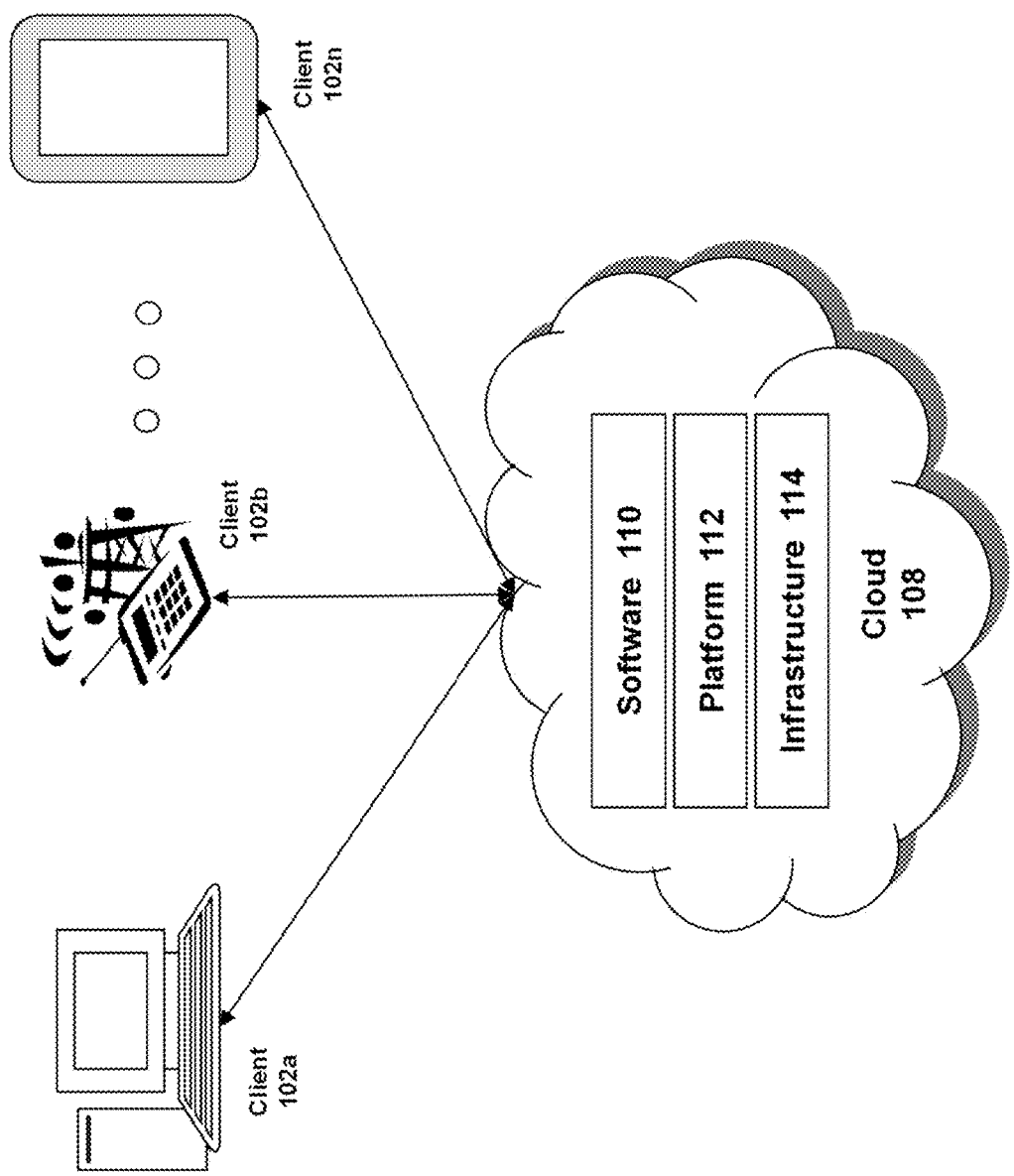
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
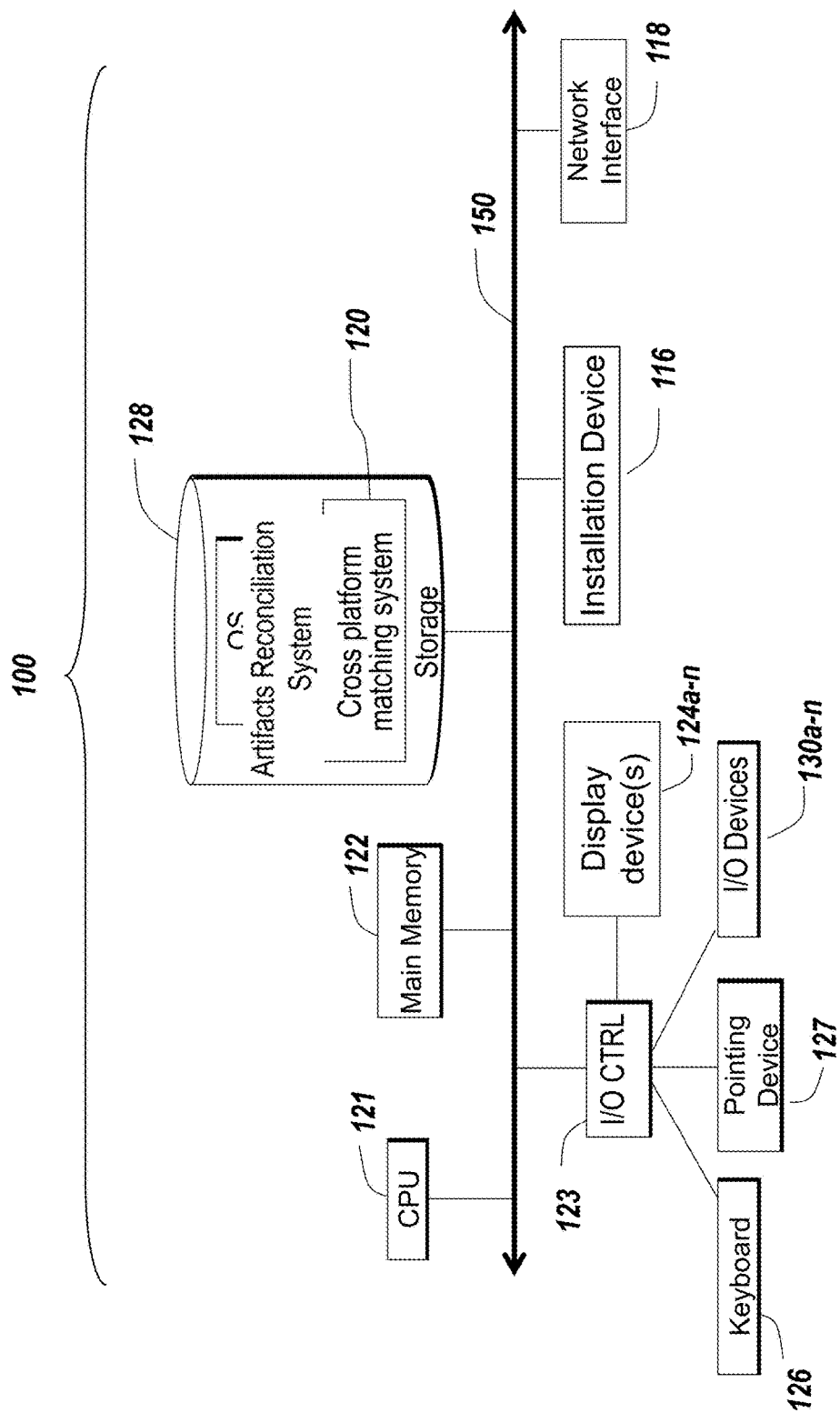
FIGS. 1C and 1D are block diagrams depicting embodiments of computing devices useful in connection with the methods and systems described herein.
Figure 1D:
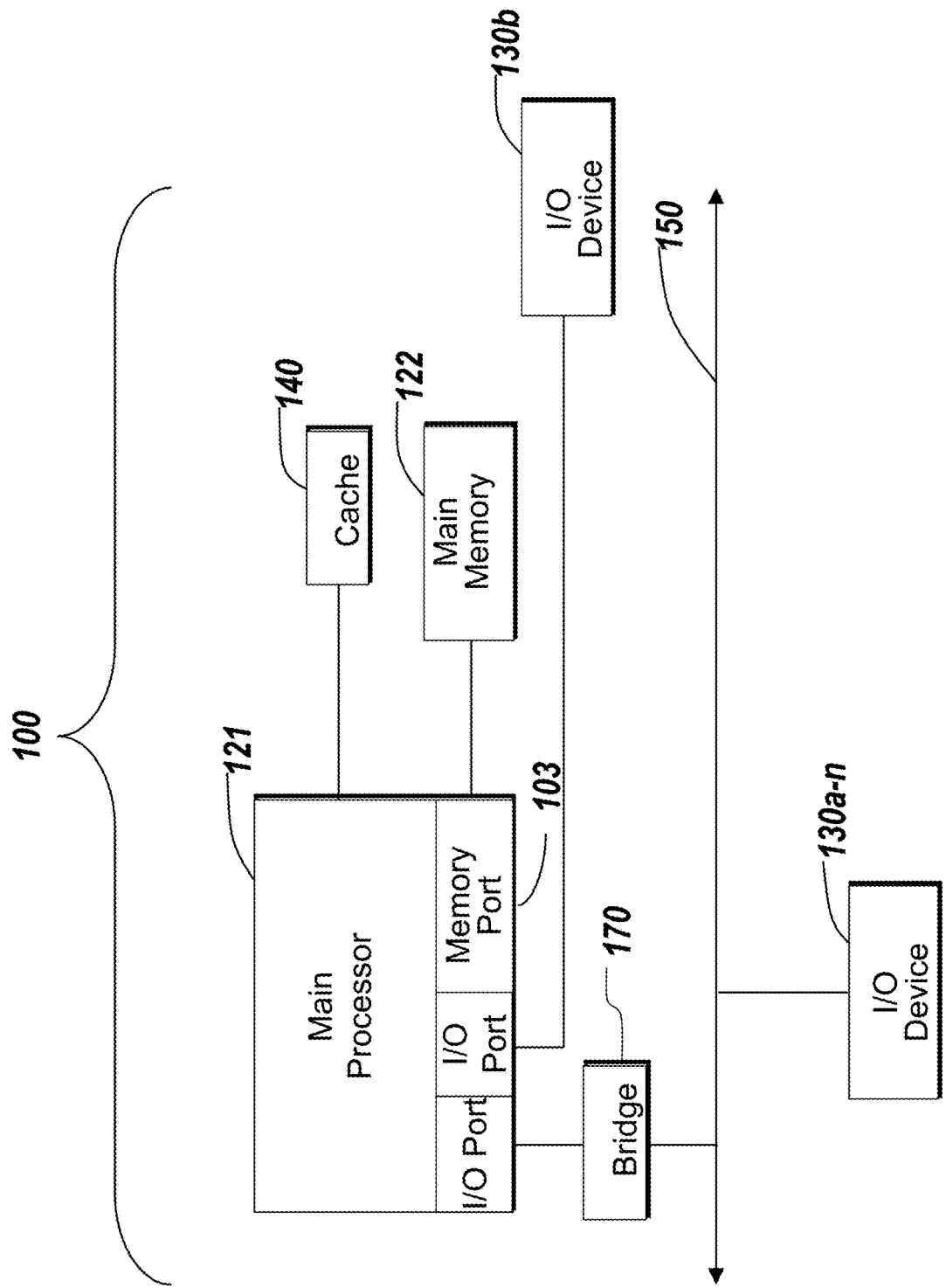

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a data processing system 200. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory.

The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multitouch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In some embodiments, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in some embodiments, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the experiment tracker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In some embodiments, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESS-CARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In some of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Automated Data Set Mapping

Systems and methods of the present solution are directed to automated data set mapping services. Automated data set mapping services may refer to matching a data set to corresponding information accessible to a data processing system. For example, a data set can include a survey including questions which are not paired to an answer. The information accessible to the data processing system may include questions corresponding to known paired answers, which may be referred to as question-answer pairs. The information accessible to the data processing system may include various answer set parameters associated with the question-answer pairs (e.g., a time interval, location, or service level for which the answer is valid). The data processing system can predict a classification of a received question of the data set into various pre-defined question domains, and arbitrate the predictions of the various models to identify a predicted domain. The data processing system can compare the received question to various questions of an answer set including the question-answer pairs, and select a question of a question-answer pair based on a similarity to the received question. The data processing system can present an answer of the question-answer pair paired with the selected question to a user via the user interface.

A data processing system includes a plurality of components, any of which may be hardware or software components. In various embodiments, one or more components of the data processing system may be collocated or remote, communicatively coupled with other components (e.g., bidirectional, or unidirectional). In some embodiments, two or more communications channels form a network, which may route various data between data processing system components, and additional devices (e.g., the components of the data processing system may be interconnected by a local access network, the internet, etc.). Advantageously, collocating the various components may allow sharing of memory, resources, etc. and may simplify management of files throughout a dispersed network. Data processing systems where individual components are dispersed may, advantageously, ease access of additional networks or information, as may be needed. For example, various networks or data storage systems the data processing system may interact with may be protected by network filters, firewalls, etc. Thus, the data processing system or individual components thereof may comprise multiple instantiations to interact with counterpart systems, or users. For example, a GUI on a user workstation may be duplicated by a mobile application, an email, etc.

This technical solution can resolve varying term meanings between domains such that a match score between a survey question and a question of a question-answer pair can be increased relative to other methods, increasing an accuracy of a match. Such increased accuracy may result in fewer or more accurate matches to present. Further, a search space for questions within each domain may be reduced relative to a global search which can reduce memory usage or scaling related performance limitations (e.g., inter-core communication). Moreover, receiving an indication of a selection of a user can improve model training and further improve selection accuracy. The nesting of questions within a domain may reduce a number of options presented to a user, which may minimize user review time of a selected domain. Thus, the present disclosure provides a technical solution to resolve technical problems of search systems determining accurate matches from varying domains, which may ascribe varying meaning to words or other text portions (e.g., character n-grams), and the operation of systems having constrained compute resources.

Figure 2:
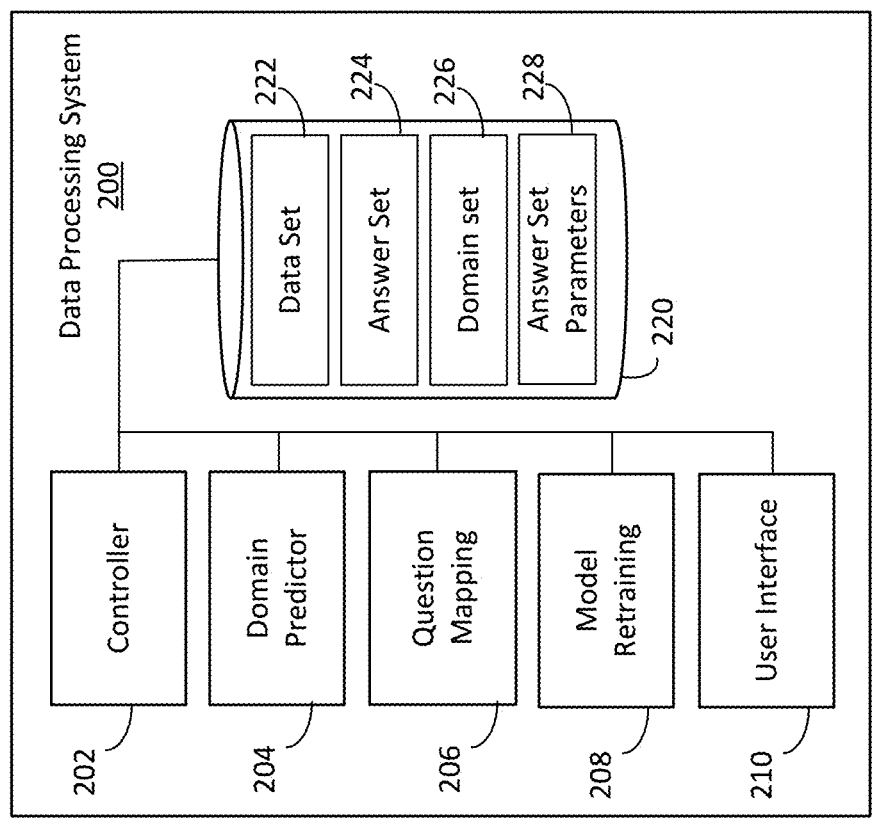
FIG. 2 is a block diagram depicting a data processing system, in accordance with some embodiments.

FIG. 2 is a block diagram depicting embodiments of a data processing system 200, in accordance with some embodiments. The data processing system 200 can include or interface with at least one controller 202 to execute instructions to employ the systems and methods described herein. The data processing system 200 can include or interface with at least one domain predictor 204 to predict a domain for an element of a data set 222 such as a question of a set of questions (e.g., a survey). The data processing system 200 can include or interface with at least one question mapping service 206 to determine an association between an element of the data set 222 such as a question of a set of questions and a corresponding element accessible to the data processing system 200 such as an answer to the question. The data processing system 200 can include or interface with at least one model retraining service 208 to train or retrain a machine learning model of the data processing system 200 (e.g., of the domain predictor 204 or the question mapping service 206). The data processing system 200 can include or interface with at least one user interface 210 to exchange information between the data processing system 200 and a user.

The controller 202, domain predictor 204, question mapping service 206, model retraining service 208, or user interface 210 can each include or interface with at least one processing unit or other logic device such as a programmable logic array engine, or module configured to communicate with a data repository 220 or database. The controller 202, domain predictor 204, question mapping service 206, model retraining service 208, or user interface 210 can be separate components, a single component, or part of the data processing system 200. The data processing system 200 can include hardware elements, such as one or more processors, logic devices, or circuits. For example, the data processing system 200 can include one or more components or structures of functionality of computing devices depicted in FIGS. 1A-1D.

The data repository 220 can include one or more local or distributed databases, and can include a database management system. The data repository 220 can include computer data storage or memory and can store one or more of a data set 222, an answer set 224, a domain set 226, and answer set parameters 228. The data set 222 can include representation of one or more questions from a survey which may correlate to a domain set 226 or answer set 224. The answer set 224 can include or correspond to questions paired with the answers. For example, the answer set 224 can include a set of questions which are associated with one or more domains, such that an answer corresponds to a question, and each question-answer pair corresponds to a domain. The domain set 226 can include various domains corresponding to the questions. Each domain can correspond to a clustered set of questions. For example, a domain for a cloud-provider can include a physical security domain, application security domain, continuity and recovery domain, remote access domains, user authorization domains, and so on. The domain set 226 may be employed to restrict or adjust a weight of a question corresponding to one or more domains of the domain set 226. The answer set parameters 228 can include further information associated with an answer set 224. For example, an answer set parameter 228 can include a time interval indicating a validity of an answer, a policy or other source document liked to an answer, a link to a correlated answer of the answer set 224, or an indication that the answer may vary according to a selected service level, data type, or municipality (e.g., European Union, United States, California).

The data processing system 200 can include, interface with, or otherwise utilize at least one controller 202. The controller 202 can include or interface with one or more processors and memory. The processor can be implemented as a specific purpose processor, an application specific integrated circuit (ASIC), one or more field programmable gate arrays (FPGAs), a group of processing components, or other suitable electronic processing components. The processors and memory can be implemented using one or more devices, such as devices in a client-server implementation. The memory can include one or more devices (e.g., random access memory (RAM), read-only memory (ROM), flash memory, hard disk storage) for storing data and computer code for completing and facilitating the various user or client processes, layers, and modules. The memory can be or include volatile memory or non-volatile memory and may include database components, object code components, script components, or any other type of information structure for supporting the various activities and information structures of the inventive concepts disclosed herein. The memory can be communicably connected to the processor and include computer code or instruction modules for executing one or more processes described herein. The memory can include various circuits, software engines, and/or modules that cause the processor to execute the systems and methods described herein.

The controller 202 can include or be coupled with communications electronics. The communications electronics can conduct wired and/or wireless communications. For example, the communications electronics can include one or more wired (e.g., Ethernet, PCIe, or AXI) or wireless transceivers (e.g., a Wi-Fi transceiver, a Bluetooth transceiver, a NFC transceiver, or a cellular transceiver). The controller 202 can cause one or more operations disclosed, such as by employing another element of the data processing system 200. For example, operations disclosed by other elements of the data processing system 200 may be initiated, scheduled, or otherwise controlled by the controller 202.

The data processing system 200 can include, interface with, or otherwise utilize at least one domain predictor 204. The domain predictor 204 can receive a data set 222 comprising a representation of one or more questions from a survey, or a derivative thereof (e.g., a vector derived therefrom). The questions can be received individually or the domain predictor 204 can parse questions from the received representation. For example, the domain predictor 204 can receive surveys having various formats from various sources (e.g., JSON, XML, csv, free text, or the like), parse questions from the survey to generate a standardized format, and store the parsed questions of the survey as a data set 222.

The domain predictor 204 can vectorize each question. Vectorization may include or be preceded by pre-processing such as the removal of special characters such as carriage returns, normalization of capitalization, and a removal of any stop words, phrases, characters, or the like. Stop words can include predefined words for exclusion, such as according to a non-correlation with a prediction of the domain predictor 204, a question mapping service 206, or the like. For example, according to some implementations, stop words can include "a," "an," "and," "the," "on," "unit," "of" and so forth). According to some implementations, some phases can be whitelisted in advance of a removal of stop words. For example, "chain of custody" or "segregation of duty" can be whitelisted such that the phrase may thereafter be processed as a complete phrase. A vectorization service of the domain predictor 204 can receive questions or other text corpuses subsequent to any preprocessing. The vectorization service can thereafter determine a vector summation (also referred to as a vectored questions) for each question corresponding to the sum of the words or phrases of the questions as is further discussed with regard to FIG. 3.

The domain predictor 204 can include various machine learning models which can ingest the vectored questions. In some embodiments, the vectored questions may vary for each machine learning model or be shared therebetween one or more of the machine learning models. Each machine learning model can determine an association of the vectored question with one or more question domains of the domain set 226. For example, a machine learning model can determine an association score, or ranked order, or another indication of a confidence of a match between a question and an answer. The domain predictor 204 may include an arbitration (e.g., voting) mechanism to arbitrate varying selections of the various machine learning models. The various elements of the domain predictor 204 are discussed in additional detail with regard to FIG. 3.

The data processing system 200 can include, interface with, or otherwise utilize at least one question mapping service 206. The question mapping service 206 can determine an association between an element of a data set 222 such as a question of a set of questions and a corresponding element accessible to the data processing system 200 such as an answer to the question. The question mapping service 206 can receive vectored questions vectors generated for or by the domain predictor 204, or may vectorize the questions according to a vectorization service, which may differ from those of the domain predictor 204. For example, the question mapping service 206 can apply a different vector for a word or phrase according to a domain determined by the domain predictor 204 (e.g., "access control" can indicate a different meaning in a physical control domain than a remote authentication domain).

The question mapping service 206 can interface with an answer set 224 including a question-answer pair, and one or more answer set parameters 228 (e.g., localization information, time intervals, or the like). The question mapping service 206 can determine a similarity between a question of the question-answer pairs, and the vector. For example, the question mapping service 206 can determine a similarity between a vectored question and a question of the answer set 224. The similarity may be a numeric relevance, such as a percent confidence of a match, a distance between the data set 222 item and an answer set 224 (e.g., a cosine distance), etc. The question mapping service 206 may evaluate one or more answer set parameters 228, such as a time interval (e.g., an expiration date or an implementation date). For example, each question can include a default expiration date (e.g., annually, quarterly, etc.) which may be updated upon a confirmation, received by the user interface 210 of the validity of a question. Some questions may include future validity dates such as features, practices, or controls implemented according to a planned change in operating practice. Further answer set parameters 228 can include localization or account differentiation, where an answer may vary based on a municipality, customer type, or service level. Further answer set parameters 228 can include pointers between answers. For example, an answer set 224 parameter including an expiring validity can include a pointer to another answer becoming effective upon the expiration, or to an answer which is not indexed by the answer database. The other answer may not be indexed because a machine learning model has not been updated since the publishing of the answer, or based on a user indication to present the question received via a user interface 210. The various elements of the question mapping service 206 are discussed in additional detail with regard to FIG. 4.

The data processing system 200 can include, interface with, or otherwise utilize at least one model retraining service 208. The model retraining service 208 can receive an indication of the selection of one or more answers of the answer set 224 presented by the user interface 210, and update a machine learning model based on the selection. For example, the model retraining service 208 can receive an indication of a domain or answer displayed to a user, including user-selected options and unselected options. The model retraining service 208 may maintain a queue of user-selected options and unselected options. The model retraining service 208 may retrain the model at a periodic interval or based on a number of data of the queue. For example, the model retraining service 208 can retrain the machine learning model after a receipt of 100,000 selections, annually, quarterly, or according to another release schedule (e.g., corresponding to an update to other instructions executable by the controller 202). The model retraining service 208 can retrain each machine learning model at a same time or over a cascaded period. For example, the model retraining service 208 can train a first machine learning model, and thereafter determine a change in prediction accuracy for the updated first machine learning model. The model retraining service 208 may retrain the model, revert to a previous instance of a model, or weight a prediction of the model based on the change in predication accuracy. For example, an updated model can be evaluated relative to agreement with other machine learning models or a selection of a user, via the user interface 210, of a domain or an answer predicted by the machine learning model.

The data processing system 200 can include, interface with, or otherwise utilize at least one user interface 210. The user interface 210 provides an input/output interface to a user, and is communicatively coupled, through one or more communications channels, with one or more data processing system 200 components. For example, the user interface 210 can present one or more questions of a domain to a user according to a relevance thereof. For example, the user interface 210 can receive a confidence level of a match of the one or more answers of the answer set 224, compare the confidence level to a confidence threshold, and display the answer of the answer set 224 based on the comparison (e.g., display all answers exceeding the threshold or display no answers that do not meet the threshold). According to some embodiments, the user interface 210 can present a maximum or minimum number of answers. For example, the user interface 210 can present at least three answers or a maximum of ten answers.

The user interface 210 can present an indication of a confidence of an answer. For example, the user interface 210 can present a numeric confidence score, or otherwise distinguish an indication of confidence (e.g., low-medium-high), or an indication of a highest confidence score. An indication can include a font, border, color, symbol corresponding to the answer, or the like. According to some embodiments, the user interface 210 can present the answer sets in a rank order, according to the confidence level for each match. According to some embodiments, the user interface 210 may omit a question based on a confidence level which exceeds or falls below a threshold. For example, an answer with a confidence level of 0.999 may be omitted from presentation to a user based on a high confidence of the result. For example, the presentation of the answer to a user may not significantly increase an accuracy of a selected answer (e.g., may decrease an accuracy of a selected answer). Conversely, an answer with a confidence level of 0.001 can be omitted based on a determination that the answer does not correspond to a question of a survey.

The user interface 210 can present answers corresponding to more than one domain. In some embodiments, the user interface 210 can present answers grouped according to a domain, or based on the individual relevance. In some embodiments, the user interface 210 can present questions sorted by an individual relevance, and include an indication of an associated domain. In some embodiments, a user may select a display type, such as according to an individual relevance, domain relevance, or another display type, including the various displays disclosed herein. The user interface 210 can include a search function employed by a user to search for additional answers. The search function may receive search terms from the user, and provide the user with further potential answers based on the search terms. The search function may further receive a domain from the user. For example, user interface 210 can include a control to receive a confirmation that one or more presented domains is selected, along with a further search term. Responsive to the receipt of an additional search term, the user interface 210 can present additional questions to the user.

The user interface 210 can receive a user input indicating a selection of an answer presented by the user interface 210, or a search term or domain employed by a user to search for an answer. The user interface 210 can cause the various user inputs to be stored, or disseminated to other portions of the data processing system 200. For example, the model retraining service 208 can retrain the various machine learning models based on the search terms, the selected domains, or other actions taken by the user.

FIG. 3 depicts an answer set 224 including question-answer pairs, in accordance with some embodiments. Each answer 306 can include or correspond to a unique identifier 302, which may include embedded information such as one or more domains associated with the question-answer pairs, a column number, or a date of entry. In some embodiments, further information such as the associated domain can be otherwise linked (e.g., in another column of the data structure of the answer set 224). Each question-answer pair can include or be associated with at least one question 304. The respective questions 304 can include or correspond to a text field such as a string, free text field, or the like. For example, the text field can include searchable, human readable questions 304. The respective questions 304 can include or correspond to a vectorized question. For example, the answer set 224 can include or interface with one or more vectorized questions, such as questions vectorized for domain prediction or an association of a question within a domain. The respective answers 306 can include or correspond to a text field such as a string, free text field, or the like. Each answer 306 can correspond to at least one question 304. Upon a matching of a question of a data set 222 with a question 304 of an answer set 224, the data processing system 200 can present the at corresponding answer 306 via the user interface 210.

As indicated above, each answer 306 of the answer set 224 can include various answer set parameters 228. For example, the depicted answer set parameters 228 include a time interval 308 during which the answer 306 is valid, such as an indication of an implementing or expiration date associated with the answer 306. The depicted answer set parameters 228 include an applicability indication 310, which may include one or more answer set parameters 228 such as a municipality, level of service, or the like. For example, the applicability may vary according to a municipality of data storage, operation, or end-consumer residence (e.g., General Data Prediction Regulation (GDPR), California Consumer Privacy Act (CCPA), or the like).

Figure 4:
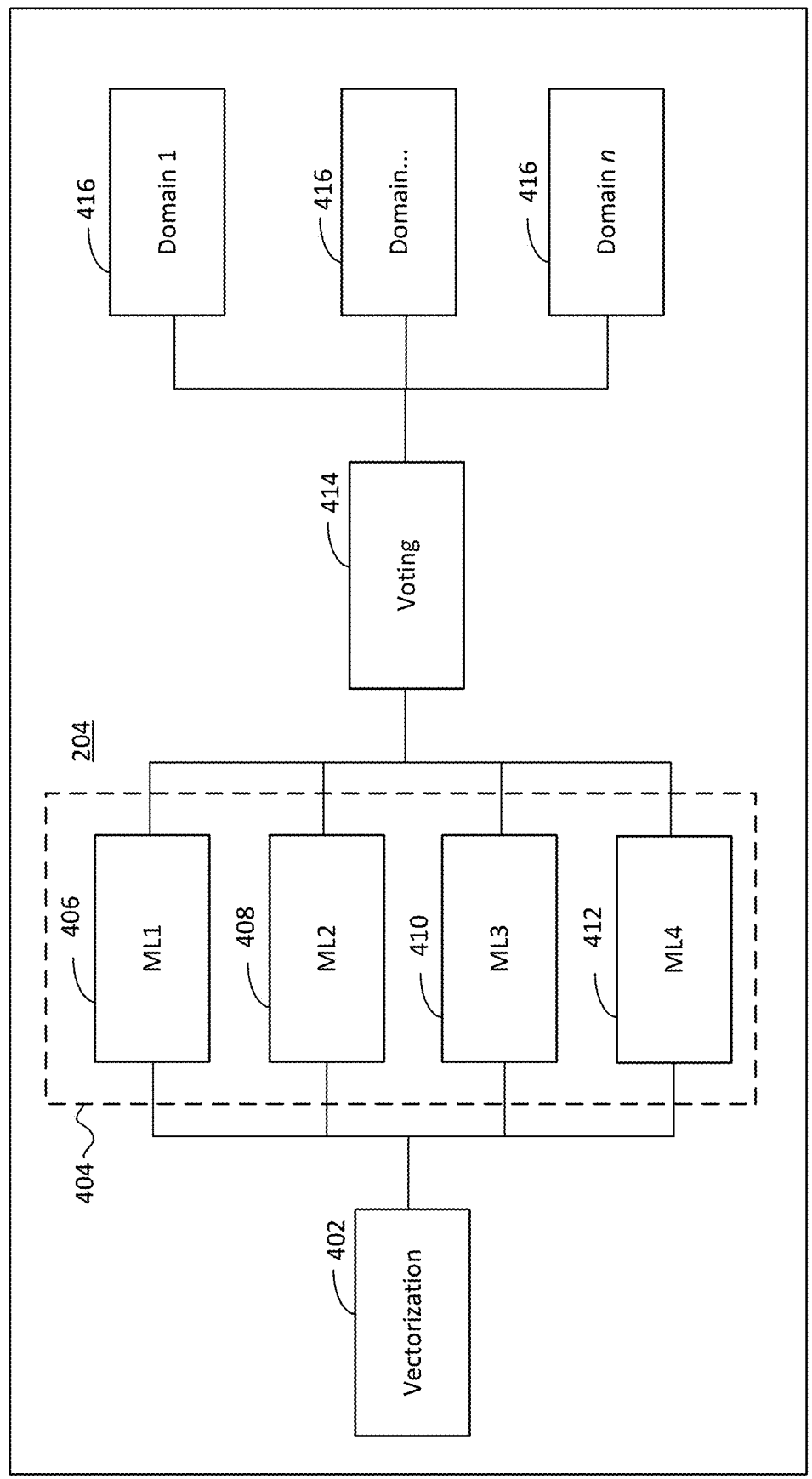
FIG. 4 is a block diagram of a domain predictor for a data set mapping service, in accordance with some embodiments.

FIG. 4 is a block diagram depicting embodiments of a domain predictor 204 for a data set mapping service, in accordance with some embodiments. A vectorization service 402 can determine a vector for each question of the data set. For example, each gram (e.g., word or phrase) of the data set 222 can correspond to a plane of vector space, whereby a summation of the vectors for each gram generated the vectored question. The vectorization service 402 can be trained based on known relationships between questions and domains, such as based on the questions and domains of the answer set 124. According to some embodiments, the vectorization service 402 can be trained based on answers of the answer set 124 corresponding to the respective domains, or based on other (e.g., public or private) data.

An ensemble of machine learning models 404 can ingest the vectorized questions from the vectorization service 402 and predict a domain for each vectorized question. The ensemble of machine learning models 404 can include instantiations of models of one or more types. For example, the machine learning models 404 can include a support vector machine (SVM) model 406, a multinomial logistic regression model 408, a neural network 410, or a random forest 412. The depicted models are not intended to be limiting. According to various embodiments, an ensemble of machine learning models 404 may employ additional or fewer machine learning models 404, or machine learning models 404 of a different type.

The support vector machine (SVM) model 406 can classify a question of a data set 222 in a vector space (e.g., the vector space received from the vectorization service 402). The SVM model 406 can determine a line or hyperplane segmenting various domains, such that a domain of a question can be predicted according to a location thereof. For example, the SVM model 406 can determine a line or hyperplane separating a first domain from a second domain. A vectored question of an unknown domain can thereafter be categorized as clustered with the first domain or the second domain based on a position thereof (e.g., a first or second side of the line or hyperplane). In some embodiments, the SVM model 406 can employ multiple iterations to discriminate between more than two domains (e.g., between a subset of the domain set 226), or can include more than one line or hyper plane to define a volume of the vector space associated with each domain of the set of domains.

The data processing system 200 can train (e.g., retrain) the machine learning models 404 including the SVM model 406 based on the questions of the data set 222. The data processing system 200 (e.g., the model retraining service 208) can train the various models based on answers 306 selected from the user interface 210. For example, the models can be retrained upon receipt of selected or unselected answers 306 from the user interface 210. According to some embodiments, the data processing system 200 can determine a first portion of the answer set 224 for training and a second portion of the answer set 224 for model verification. For example, the data processing system 200 may employ stratified data sampling to designate, for each domain of the domain set 226, a portion of questions 304 for training data and a portion of questions 304 for test data. For example, at least half (e.g., about 70%) of the questions 304 can be designated for training, and less than half (e.g., about 30%) of the questions 304 can be designated for testing. The test data may be used to validate a model incident to placing the model into service, or to determine a weight for a model in the arbitration between the models, such as by increasing a weight in a voting service 414. In various embodiments, the SVM model 406 can be replaced with another model, such as another clustering model (e.g., k-means, mean-shift, or a hierarchical clustering model).

The SVM model 406 can receive inputs at run time. The inputs can include questions from the vectorization service 402 vectored according to a vectorization such as term frequency-inverse document frequency (td-idf) vectorization. In some embodiments, the vectorization service 402 can employ various vectorization schemes such as Word2Vec, count vectors, co-occurrence vectors, etc. The terms of the td-idf may include words or phrases of the word vector. For example, the words, phrases, or other grams of the question of the data set 222 can be compared to a number of instances of total occurrences of all questions 304 of the answer set 224 associated with a domain. Each word can include a relative weighting. For example, some words may be associated with lesser predictive weight for or more domains than other words. Responsive to the input, the SVM model 406 can output one or more predicted domains corresponding thereto.

The multinomial logistic regression model 408 can classify a question of the data set 222. For example, the multinomial logistic regression model 408 can ingest the vector representation of the questions at runtime, and correlate the vector representation as an input feature set (e.g., predictors) in the model. The model, having been trained on the portion of questions 304 designated for training (e.g., by stratified data sampling) can employ the input feature set (e.g., predictors) to predict an associated domain. The multinomial logistic regression model 408 can employ a linear predictor function (e.g., a function of a domain, k, and a predictor, i, defined by a word vector, $X_i$). The function can include a set of regression coefficients, ẞk and the word vector, $X_i$. For example, a function can be defined as $f(k, i)=\beta_k \cdot X_i$). The multinomial logistic regression model 408 can output one or more domain predictions and an associated weight for each prediction.

For at least some iterations, the function can be described as a log function, such as a function of the form $f(k, i)=\ln(Probability(Y_i=k))$, where $Y_i$ describes one or more potential domains. The multinomial logistic regression model 408 can employ large scale bound-constrained optimization techniques (L-BFGS-B) to determine (e.g., estimate) the coefficients. According to such techniques, the multinomial logistic regression model 408 may determine a search direction by identifying a set of active variables via a gradient projection, which can be held at their bounds, and thereafter (approximately) minimized by a quadratic model with respect to any free variables. The multinomial logistic regression model 408 can define the search direction as the vector from the current iterate to the (approximate) minimizer. The multinomial logistic regression model 408 can thereafter perform a line search along the search direction. The multinomial logistic regression model 408 may employ L2 regularization to prevent overfitting. Such a technique may reduce a memory use relative to other clustering methods. Once coefficients have been estimated, the probability of any particular domain can be calculated as follows, where c is a particular domain of the domain set 226:

$$\text{Probability}(Y_i = c) = \frac{e^{\beta k \cdot Xi}}{\sum_{k=1}^{k} e^{\beta k \cdot Xi}}$$

Thus, the function can determine a probability of a domain for a vectored question. The multinomial logistic regression model 408 can generate a confidence level based on the probability. For example, the probability can be cast as a confidence level, or another confidence level can be generated based on the determined probability and a performance of the multinomial logistic regression model 408 (e.g., based on a matching rate of the test data for the model). Indeed, according to the various models disclosed herein, a confidence score can be sourced from or determined based on an output of the model, in combination with a performance of the model or an output of further models. According to some embodiments, the multinomial logistic regression model 408 or other models disclosed herein can substitute, omit, or modify various operations thereof, such as based on available compute resources, data, or the like.

The neural network 410 can include a stack of distinct layers that transform a variable number of inputs being ingested by an input layer, into an output at the output layer. The inputs to the neural network 410 can correspond to dimensions of the vectorized representation of the questions and each output of the neural network 410 can correspond to a domain of the domain set 226. Various hidden layers (e.g., three hidden layers) disposed between the input and the output can form connection biases between layers, such that in response to a receipt of a vectorized representation at the input of the vectorized representation, a probability for each of the outputs can be computed. The strength of associations between various nodes of the hidden, input, or output layers can be based on training data. The training data can comprise the questions 304 of question-answer pairs associated with the respective domains (e.g., a portion of the questions 304 determined according to stratified data sampling).

The neural network 410 can output a predicted match score to various domains of the output layer. For example, the output may be a vector of real numbers corresponding to each of the domains of the domain set 226 subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function makes binary determinations about the classification of one class (i.e., the output may be classified using label A or the output may not be classified using label A).

The data processing system 200 can train the neural network 410 via back-propagation, based on known relationships between a question 304 used for training and the output layer (e.g., a matching domain). In some embodiments, the model retraining service 208 can employ a cross-entropy function loss function to adjust biases or weights between layers, such as originating at an output layer where a predicted probability (e.g., 0.15) can be compared to an known value (e.g., one or zero) such that the magnitude of the error indicated by the loss function is highest for an incorrect prediction proximal to one or zero, and lower for incorrect predictions having lower probability, which may reduce high confidence predictions which are inaccurate. As was described with respect to the multinomial logistic regression model 408, the neural network 410 or other models can employ (L-BFGS-B) to reduce overfitting. The data processing system 200 can employ a decaying learning rate during a training or retraining, which may cause a convergence of the loss function to a local minimum and reduce noisiness of the loss function from causing modeling unpredictability.

The random forest model 412 can receive the vectored representation from the vectorization service 402. The random forest model 412 includes any number of individual decision trees (e.g., about 250 decision trees). The model retraining service 208 can build the branches for the trees based on the dimensions of the vectored representation of the questions of the survey. For example, the model retraining service 208 can employ Gini indexing to control the growth of the trees (e.g., for determining one or more branches thereof), employing the questions 304 as training data (e.g., a portion of the questions 304 determined according to stratified data sampling). The model retraining service 208 can employ a maximum or minimum number of layers for the individual decision trees (e.g., between two and ten layers). According to some embodiments, the model retraining service 208 may employ other techniques to determine a branch such as information gain or Chi-square techniques. Each terminal leaf of the decision trees can include at least five records of training data. For example, terminal leaves having less than five records can be pruned or training can be continued until each terminal leaf is associated with at least five records. The model retraining service 208 may employ out-of-bag sampling to assess decision tree models, such as by comparing out-of-bag sample classification rates to the known domains of a test set of a known classification rate. A confidence level of the random forest model 412 can depend on a confidence of the random forest 412 (e.g., a number of decision trees selecting a domain of the domain set 226). In some embodiments, the confidence level of the random forest model 412 can depend on a correct classification rate of test data (e.g., the out-of-bag data to test individual decision trees, or separate test data not used to train any decision trees of the random forest 412).

The random forest model 412 can output one or more predicted classes, corresponding to the one or more predicted domains, and may determine a weight for each predication, such as according to a number or attribute of trees sharing a same classification. For example, a random forest wherein 200 of 250 trees predict a particular classification may correlate to higher confidence than a random forest wherein 150 of 250 trees predict the particular classification, though the random forest model 412 can further determine a weight based on a confidence for other classifications, a number of predicted classifications, or attributes of predictive trees.

The domain predictor 204 can include an arbitration service, such as the depicted voting service 414 to arbitrate between predictions of the various machine learning models 404. The voting service 414 can determine an overall domain prediction based on a majority or plurality vote (e.g., by summing a number of the machine learning models 404 predicting a domain for a question of the data set 222). The voting service 414 can determine an overall domain prediction based on weighting of the domain predictions of the various machine learning models 404. For example, the voting service 414 can determine a weight based on a confidence level received from the machine learning models 404, and sum the confidence levels to determine an overall domain prediction (e.g., select the domain associated with the highest summed confidence level). In some embodiments, the voting service 414 may adjust one or more weights according to a previous performance of a machine learning model 404. For example, a confidence level for a machine learning model 404 strongly correlated with a correct outcome can be weighted upwardly, relative to a machine learning model 404 less correlated with the correct outcome.

The voting service 414 can determine one or more predicted domains 416. For example, the voting service 414 can determine a most likely domain prediction 416, a second most likely domain prediction 416, and so forth. The domain predictor 204 can convey the predicted domains 416, along with any confidence levels (e.g., overall confidence levels or confidence levels of one or more machine learning algorithms) to the question mapping service 206 or the user interface 210. For example, the domain predictor 204 can convey the domain predictions 416 along with an indication of the confidence to the question mapping service 206, whereupon the question mapping service 206 can determine a matched question of the data set 222 within one or more of the domains of the domain set 226 based on the receipt of the predicted domain 416 and the confidence level thereof. For example, the question mapping service 206 can select a predefined number of predicted domains 416 based on a rank sort of the confidence levels associated therewith, or can compare the confidence level to a confidence level threshold, and determine one or more domains of the domain set 226 to search based on the comparison (e.g., wherein the confidence levels exceed the confidence level threshold).

Figure 5:
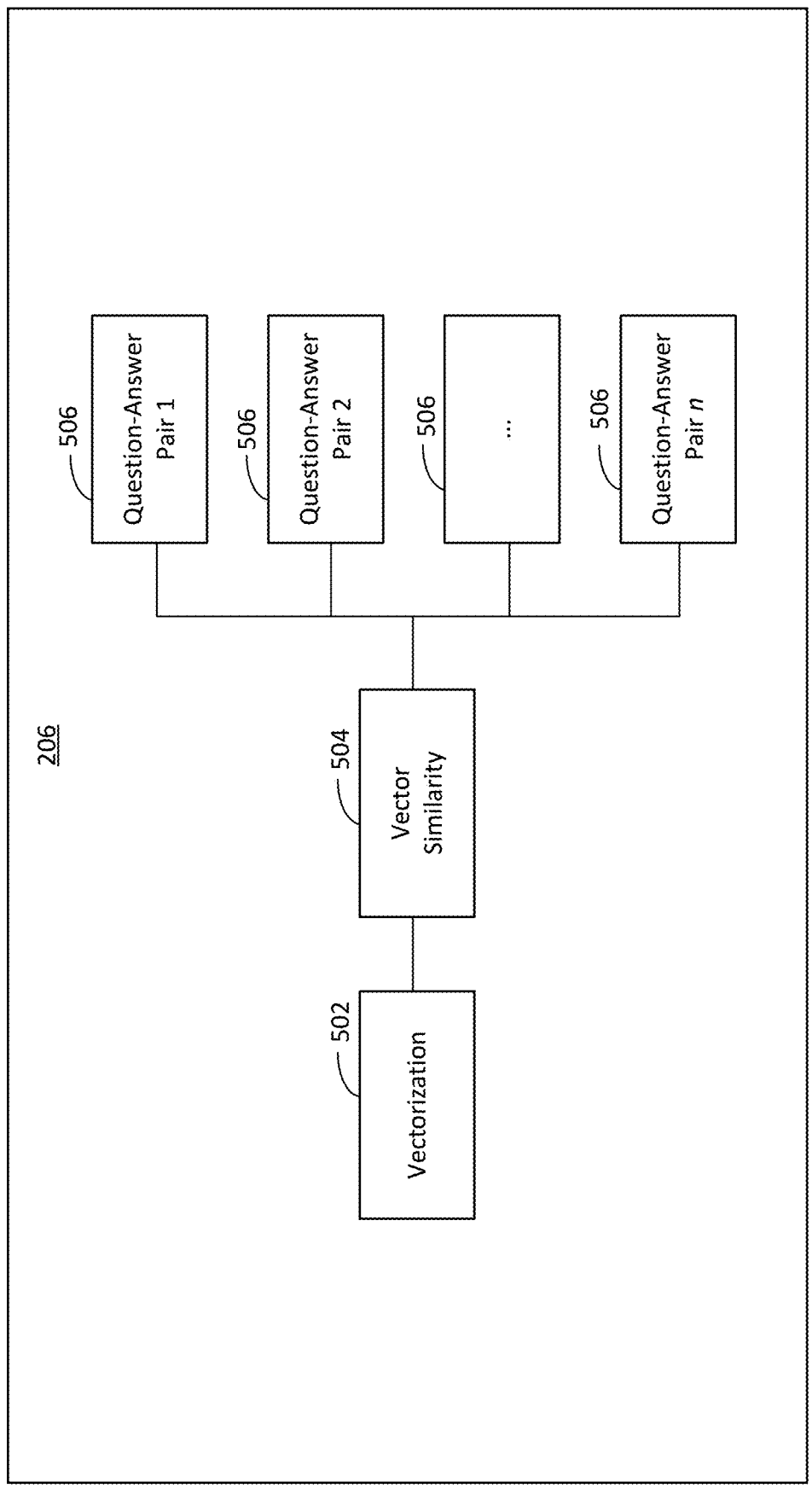
FIG. 5 is a block diagram of a question mapping service, in accordance with some embodiments.

FIG. 5 is a block diagram depicting embodiments of a question mapping service 206, in accordance with some embodiments. The vectorization service 502 of the question service can vary from the vectorization service 402 of the domain predictor 204. For example, a domain specific gram may be recognized, vectored, included in a stop word list or otherwise reviewed by the vectorization service 502 of the question mapping service 206 differently than a term or gram of the domain predictor 204. The vectorization service 502 can vectorize various questions of an answer set 224, or can retrieve stored vectorized representations of the questions for provision to the vector similarity service 504.

The question mapping service 206 can include a vector similarity service 504 to determine a similarity (e.g., a cosine similarity, Euclidean distance, or the like). For example, the vector similarity service 504 can determine a similarity between a question of a data set 222 and one or more questions of an answer set 224 (e.g., a predicted question of a domain received from the domain predictor 204). According to various embodiments, a similarity can be described as a similarity, distance, match score, or other indicia of a potential match between a question of the data set 222 and a question of the answer set 224. The vector similarity service 504 can determine matches in one or more of the predicted domains 416 (e.g., the question mapping service 206 can instantiate multiple instances of the vector similarity service 504). For example, the vector similarity service 504 can determine a similarity according to a vector space computed similarity, as is further described with regard to FIG. 6.

The vector similarity service 504 of the question mapping service 206 can predict one or more question-answer pairs 506. For example, the vector similarity service 504 can determine a similarity to a question of a question-answer pair 506, retrieve an answer corresponding to the question, and provide the answer to the user interface 210 based on the question-answer pair association between the question and answer thereof.

Figure 6:
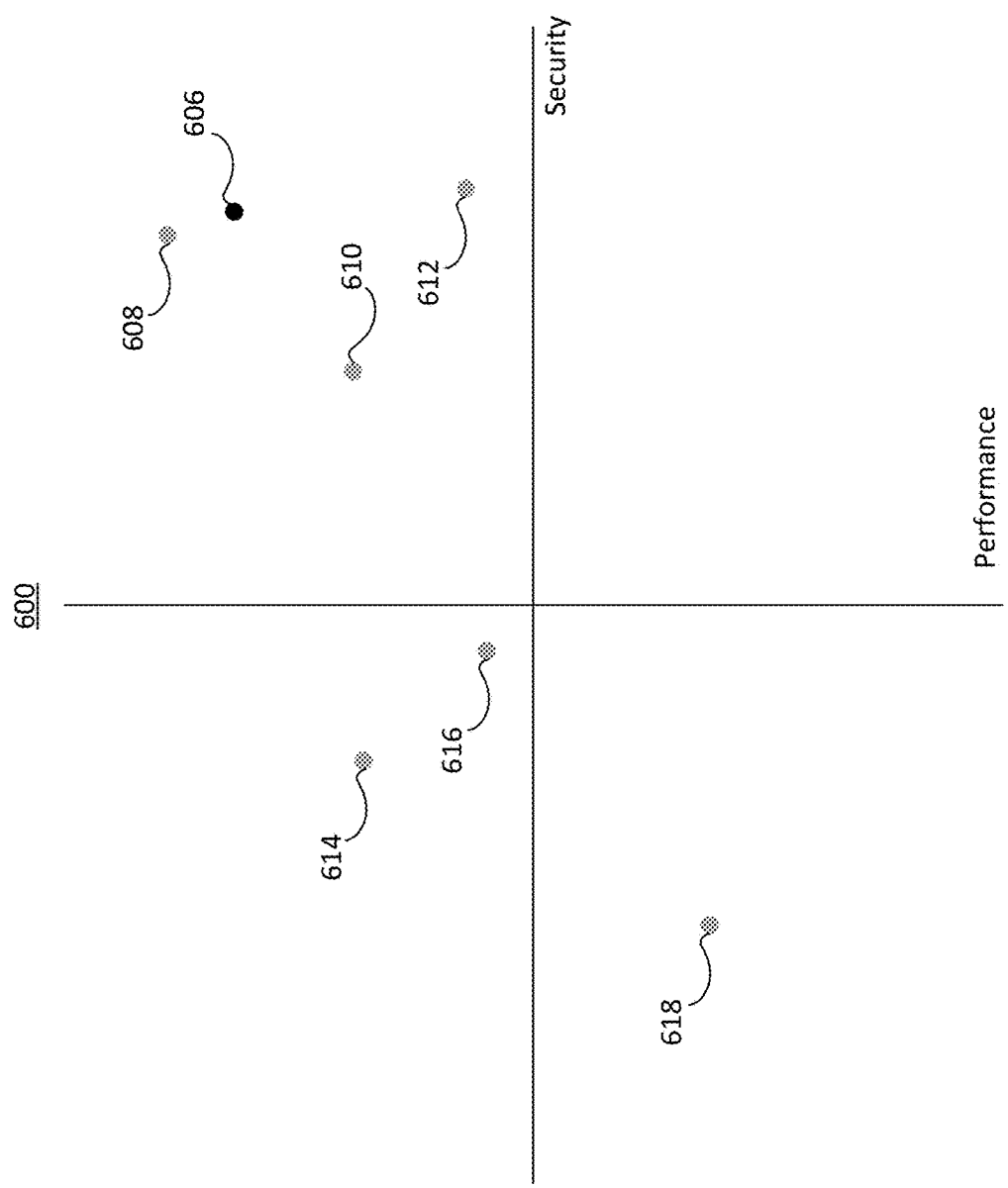
FIG. 6 is a vector space map depicting a relative location of questions of a data set and corresponding questions of a question-answer pair.

FIG. 6 is a vector space map 600 depicting a relative location of questions of a data set 222 and corresponding questions 304 of an answer set 224. The vector space map 600 includes two dimensions, a security dimension 602 and a performance dimension 604. Such an example is provided for the sake of brevity and clarity of the present disclosure. According to various embodiments of the disclosure herein, a vector space may include hundreds or thousands of dimensions. A question 606 of the data set 222 is disposed in a first quadrant of the vector space map 600 based on a vector thereof. For example, the question 606 may comprise words or other grams positively correlated with security (e.g., 'authentication', 'token', 'secure', 'trusted platform module,' or the like). The vectored representation of the question 606 is also disposed along a positive performance dimension 604. For example, the question 606 may comprise words or other grams positively associated with performance such as ('quality of service' 'container' bare-metal,' or the like).

Various questions 304 of an answer set 224 are shown disposed in the same vector space map 600. For example, a first question 608 of the answer set 224 is shown proximal to the question 606 of the data set 222, and a second question 610 of the answer set 224 is shown further from the question 606 of the data set 222. The cosine similarity between the second question 610 of the answer set 224 and the question 606 of the data set 222 may indicate correlated content, such that the questions may be matched, whereas the differing magnitude between the questions may be indicative of a difference in number of terms of each of the questions used. According to some embodiments, the question mapping service 206 can select the second question 610 of the answer set 224 based on the cosine similarity based on the content. According to some embodiments, the question mapping service 206 can select the second question 610 of the answer set 224 based on the Euclidean distance (which may increase). Each of a third question 612 of the answer set 224, fourth question 614 of the answer set 224, fifth question 616 of the answer set 224, and sixth question 618 of the answer set 224 are depicted.

The question mapping service 206 can select or rank each of the questions of the data set 222 based on, for example, the cosine distance.

Figure 7:
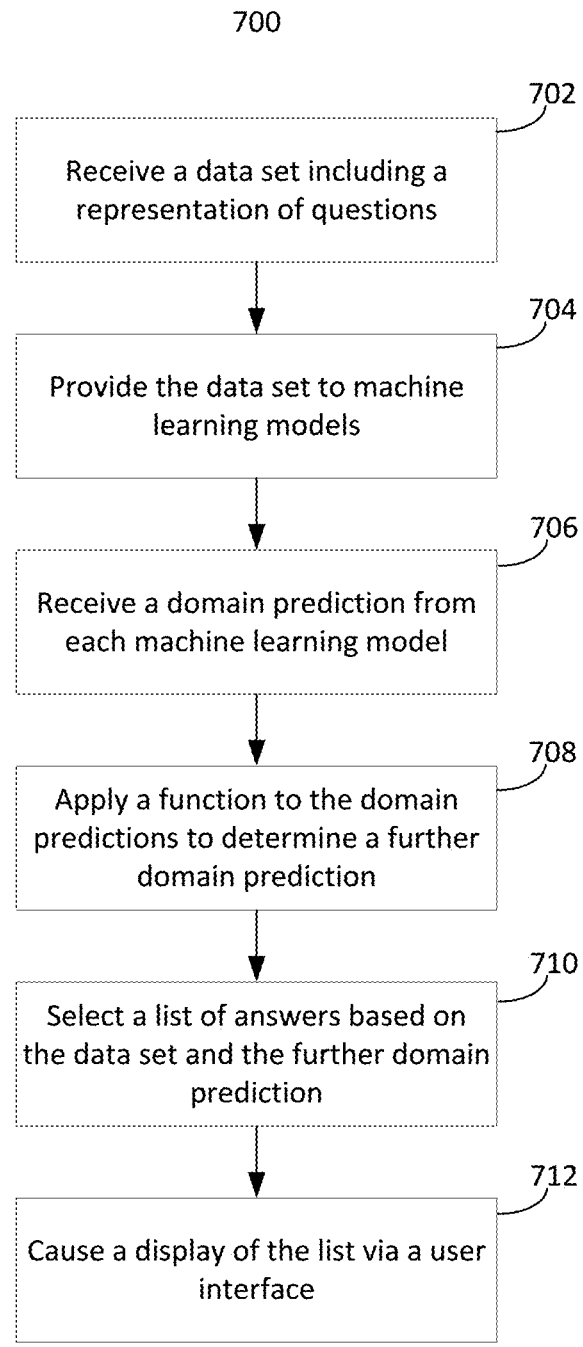
FIG. 7 is a flowchart of a method of mapping a data set to a corresponding answer, in accordance with some embodiments.

FIG. 7 is a flowchart of an example method 700, in accordance with some embodiments. The method 700 may be used to match questions received in a data set 222 to answers 306 of an answer set 224 accessible to a data processing system 200. For example, at least some of the operations described in the method 700 can determine one or more answers corresponding to a question. The method 700 is disclosed as a non-limiting example; additional operations may be provided before, during, or after the various operations of the method 700. Further, some operations may only be described briefly herein, however, the operations may be performed in conjunction with other methods, such as those disclosed herein.

In brief summary, a data processing system 200 receives a data set 222 comprising a representation of questions at operation 702. At operation 704, the data processing system 200 provides the data set 222 to machine learning models 404. The data processing system 200 receives a domain prediction from each machine learning model 404 at operation 706. The data processing system 200 applies a function to the domain predictions to determine a further domain prediction at operation 708. The data processing system 200 selects a list of answers 306 based on the data set 222 and the further domain prediction at operation 710. At operation 712, the data processing system 200 causes a display of the list via a user interface 210.

Referring to operation 702, the data processing system 200 receives a data set 222 including a representation of one or more questions. For example, the questions can be questions of a survey. The representations can include human readable questions such as a plain text or formatted text document including various questions, or may include questions which are delimited such as according to a JSON, XML, csv, or free text format, or the like. The data processing system 200 can preprocess the data set 222 for provision to a domain predictor 204. For example, the data processing system 200 can parse, delimit, reformat, or remove stop words from the questions from the received representation. The data processing system 200 can provide a representation of the data set 222 which may be modified or unmodified relative to the representation of the data set 222 received by the domain predictor 204.

Referring to operation 704, the data processing system 200 provides the data set 222 as input to various machine learning models 404. For example, the data processing system 200 can supply the data set 222 to the machine learning models 404 of the domain predictor 204. Prior to or upon the provision to the domain predictor 204, the data set 222 can be vectorized such that the data set 222 can be ingested by the machine learning models 404. For example, the data set 222 can be vectorized to generate various inputs to the machine learning models 404. The machine learning models 404 may be trained to predict a domain associated with the one or more questions. For example, the machine learning models 404 can be trained in a first or subsequent instance by the model retraining service 208.

Referring to operation 706, the data processing system 200 receives, as output from each the machine learning models 404, a domain prediction. For example, the data processing system 200 (e.g., a voting or other arbitration service thereof) can receive an output ranking, list, or other representation of predictions of one or more domains of the domain set 226. The domain prediction can include the one or more domains along with a confidence level, which may be weighted based on a performance of the machine learning model 404, the type of the machine learning model 404, or the like.

Referring to operation 708, the data processing system 200 determines a further domain prediction for each of the questions based on applying a function to each of the first domain predictions. For example, the voting or other arbitration service can apply the function. The function can include a summation of a number of selected matching domains (e.g., a majority or plurality thereof). The function can include a summation of the confidence level for a domain (e.g., a confidence level of a first model may be 0.6, and a confidence level of a second model can be 0.7, such that a total confidence is 1.3). The confidence levels may be adjusted or unadjusted weights (e.g., weights based on the machine learning model 404 or a performance thereof). The examples provided herein are not intended to be limiting, the data processing system 200 can apply various functions to arbitrate between the selections of the various machine learning models 404. For example, outliers can be discounted or removed, confidence levels predicted by individual machine learning models 404 can be adjusted according to a non-linear function, or another confidence interval (e.g., aggregate confidence interval) can be defined.

Referring to operation 710, the data processing system 200 selects an enumerated list of answers 306 from an answer set 224. For example, the data processing system 200 can select the enumerated list based on a predefined number of answers 306 associated with questions on a selected domain of the domain set 226. The data processing system 200 can compare answers 306 associated with a predicted domain with the question of the data set 222 and select an answer 306 corresponding to a similar question of the data set 222. For example, the question of the answer set 224 can be compared to the question of the data set 222 for similarity (e.g., cosine similarity), and the data processing system 200 can retrieve the associated answer 306 of the answer set 224. The data processing system 200 can select the enumerated list based on a comparison of the similarity of the question of the answer set 224. For example, the data processing system 200 can select a predefined number of answers 306 corresponding to questions having a highest confidence level (in one or more domains), or may select all answers 306 corresponding to questions of the answer set 224 exceeding a predefined similarity threshold. The data processing system 200 can select the enumerated list based on the data set 222 and the second domain prediction. For example, the selection can be in a single domain, predicted as a match, or multiple domains can be searched, such as according to the confidence levels for each.

Referring to operation 712, the data processing system 200 causes a display of the enumerated list via a user interface 210 for selection. For example, the data processing system 200 can cause the user interface 210 to display the various answers 306 for selection from a user, whereby the user may select zero or more answers 306, and provide further search terms or direction via the user interface 210 to search for additional answers, which may thereafter be selected. Any selection or non-selection received by the user interface may be employed to retrain one or more of the machine learning models. For example, responses may reinforce correct predicting models, or adjust incorrectly predicting models. The responses may also be employed by the data processing system 200 to evaluate a performance of the various machine learning models. The data processing system 200 may thereafter determine a weighting between the models based on the performance.

While the invention has been particularly shown and described with reference to specific embodiments, it should be understood by those skilled in the art that various changes in form and detail may be made therein without departing from the spirit and scope of the invention described in this disclosure.

Various descriptions, herein, make use of the word "or" to refer to plurality alternative options. Such references are intended to convey an inclusive or. For example, various data processing system 200 components herein are referred to as hardware or software components. Such a disclosure indicates that the components may comprise a hardware component, a software component, or both a hardware and software components.

What is claimed:
1. A method comprising,
receiving, by a data processing system, a data set comprising a representation of one or more questions from a survey;
providing, by the data processing system, the data set as input to each instantiation of a plurality of different types of machine learning models trained to predict a domain associated with the one or more questions;

receiving as output, by the data processing system, a first domain prediction for the domain from each instantiation of a plurality of different types of machine learning models;

determining, by the data processing system, a second domain prediction for the domain for each question of the one or more questions based on applying a function to each of the first domain predictions;

selecting, by the data processing system, based on the data set and the second domain prediction, an enumerated list of one or more answers from an answer set;

and causing, by the data processing system, a display of the enumerated list via a user interface for a selection;

receiving, by the data processing system, an indication of the selection of one of the answers from the enumerated list; and retraining, by the data processing system, one or more machine learning models of the plurality of different types of machine learning models based on the indication of the selection.

2. The method of claim 1, further comprising:

generating, by each of the plurality of machine learning models, a first confidence level for each of the first domain predictions;

determining, by the data processing system, a second confidence level based on each of the first confidence levels; and causing, by the data processing system, a display of the second confidence level for the selection of each answer of the enumerated list via the user interface.

3. The method of claim 1, wherein applying the function to each of the first domain predictions comprises summing a number of the machine learning models sharing a predicted domain for each of the one or more questions.

4. The method of claim 1, wherein applying the function to each of the first domain predictions comprises:

receiving a confidence level for the first domain predictions from each of the plurality of machine learning models;

summing the confidence level of the first domain predictions for each of the predicted domains; and selecting a domain of the predicted domains associated with a highest confidence level summation.

5. The method of claim 1, wherein an answer of the answer set includes a time interval for which the answer is valid.

6. The method of claim 1, wherein causing the display of the enumerated list comprises:

causing the display of a plurality of domains; and causing the display of an association between each of the answers of the enumerated list and one of the plurality of domains.

7. A system comprising:

at least one processor associated with a data processing system;

at least one memory storing computer-readable instructions, wherein the at least one processor is operable to access the at least one memory and execute the computer-readable instructions to:

receive a data set comprising a representation of one or more questions from a survey;

provide the data set as input to each instantiation of a plurality of different types of machine learning models trained to predict a domain associated with the one or more questions;

receive as output a first domain prediction for the domain from each instantiation of a plurality of different types of machine learning models;

determine a second domain prediction for the domain for each question of the one or more questions based on applying a function to each of the first domain predictions;

select, based on the data set and the second domain prediction, an enumerated list of one or more answers from an answer set;

cause a display of the enumerated list via a user interface for a selection;

receive an indication of the selection of one of the answers from the enumerated list; and retrain a machine learning model of the plurality of different types of machine learning models based on the indication of the selection.

8. The system of claim 7, wherein the processors execute computer-readable instructions to:

generate, by each of the plurality of machine learning models, a first confidence level for each of the first domain predictions;

determine a second confidence level based on each of the first confidence levels; and cause a display of the second confidence level for the selection of each answer of the enumerated list via the user interface.

9. The system of claim 7, wherein, to apply the function to each of the first domain predictions, the processors execute computer-readable instructions to sum a number of the machine learning models sharing a predicted domain for each of the one or more questions.

10. The system of claim 7, wherein, to apply the function to each of the first domain predictions comprises, the processors execute computer-readable instructions to:

receive a confidence level for the first domain predictions from each of the plurality of machine learning models;

sum the confidence level of the first domain predictions for each of the predicted domains; and select a domain of the predicted domains associated with a highest confidence level summation.

11. The system of claim 7, wherein each answer of the answer set includes a time interval for which the answer is valid.

12. The system of claim 7, wherein to cause the display of the enumerated list, the processors execute computer-readable instructions to:

cause the display of a plurality of domains; and cause the display of an association between each of the answers of the enumerated list and one of the plurality of domains.

13. A non-transitory computer-readable media comprising computer-readable instructions stored thereon that when executed by one or more processors of a data processing system cause the one or more processors to:

receive a data set comprising a representation of one or more questions from a survey;

provide the data set as input to each instantiation of a plurality of different types of machine learning models trained to predict a domain associated with the one or more questions;

receive as output a first domain prediction for the domain from each instantiation of a plurality of different types of machine learning models;

determine a second domain prediction for the domain for each question of the one or more questions based on applying a function to each of the first domain predictions;

select, based on the data set and the second domain prediction, an enumerated list of one or more answers from an answer set; and cause a display of the enumerated list via a user interface for a selection;

receive an indication of the selection of one of the answers from the enumerated list; and retrain one or more machine learning models of the plurality of different types of machine learning models based on the indication of the selection.

14. The non-transitory computer-readable media of claim 13, wherein the computer-readable instructions comprise instructions to:

generate, by each of the plurality of machine learning models, a first confidence level for each of the first domain predictions;

determine a second confidence level based on each of the first confidence levels; and cause a display of the second confidence level for the selection of each answer of the enumerated list via the user interface.

15. The non-transitory computer-readable media of claim 13, wherein the computer-readable instructions comprise instructions to sum a number of the machine learning models sharing a predicted domain for each of the one or more questions.

16. The non-transitory computer-readable media of claim 13, wherein, to apply the function to each of the first domain predictions comprises, the processors execute computer-readable instructions to:

receive a confidence level for the first domain predictions from each of the plurality of machine learning models;

sum the confidence level of the first domain predictions for each of the predicted domains; and select a domain of the predicted domains associated with a highest confidence level summation.

17. The non-transitory computer-readable media of claim 13, wherein to cause the display of the enumerated list, the processors execute computer-readable instructions to:

cause the display of a plurality of domains; and cause the display of an association between each of the answers of the enumerated list and one of the plurality of domains.

\* \* \* \* \*